United States Patent [19]

Brereton

[11] 4,283,216
[45] Aug. 11, 1981

[54] PRODUCING GLASS SHEETS OF REQUIRED CURVED SHAPE

[75] Inventor: Paul A. Brereton, Birmingham, England

[73] Assignee: Triplex Safety Glass Company Limited, Birmingham, England

[21] Appl. No.: 102,228

[22] Filed: Dec. 10, 1979

[30] Foreign Application Priority Data

Dec. 11, 1978 [GB] United Kingdom ............... 47920/78

[51] Int. Cl.³ ........................................... C03B 23/03
[52] U.S. Cl. ....................................... 65/106; 65/104; 65/273; 65/287; 65/290
[58] Field of Search ................. 65/104, 106, 273, 287, 65/290

[56] References Cited

U.S. PATENT DOCUMENTS

| 2,250,628 | 7/1941 | Forbes | 65/106 |
| 3,454,298 | 7/1969 | Bognar | 65/106 |
| 3,846,110 | 11/1974 | Burns | 65/273 |
| 3,854,920 | 12/1974 | Kay et al. | 65/106 |
| 3,951,634 | 4/1976 | Hall et al. | 65/104 |

*Primary Examiner*—Arthur D. Kellogg
*Attorney, Agent, or Firm*—Burns, Doane, Swecker & Mathis

[57] ABSTRACT

A glass sheet is suspended from a series of tongs which grip the upper margin of the sheet and apply individual forces at the gripping locations at least some of which have components acting out of the plane of the sheet. The magnitude and direction of each of said forces is selected to ensure that the suspended sheet, when at forming temperature, adapts towards a predetermined curved shape. The sheet may be bent with the forces acting at the gripping points before and/or after bending, and the sheet adopts the required curved shape when it is sufficiently stiffened to be influenced by the remanent forces applied at the gripping points.

28 Claims, 15 Drawing Figures

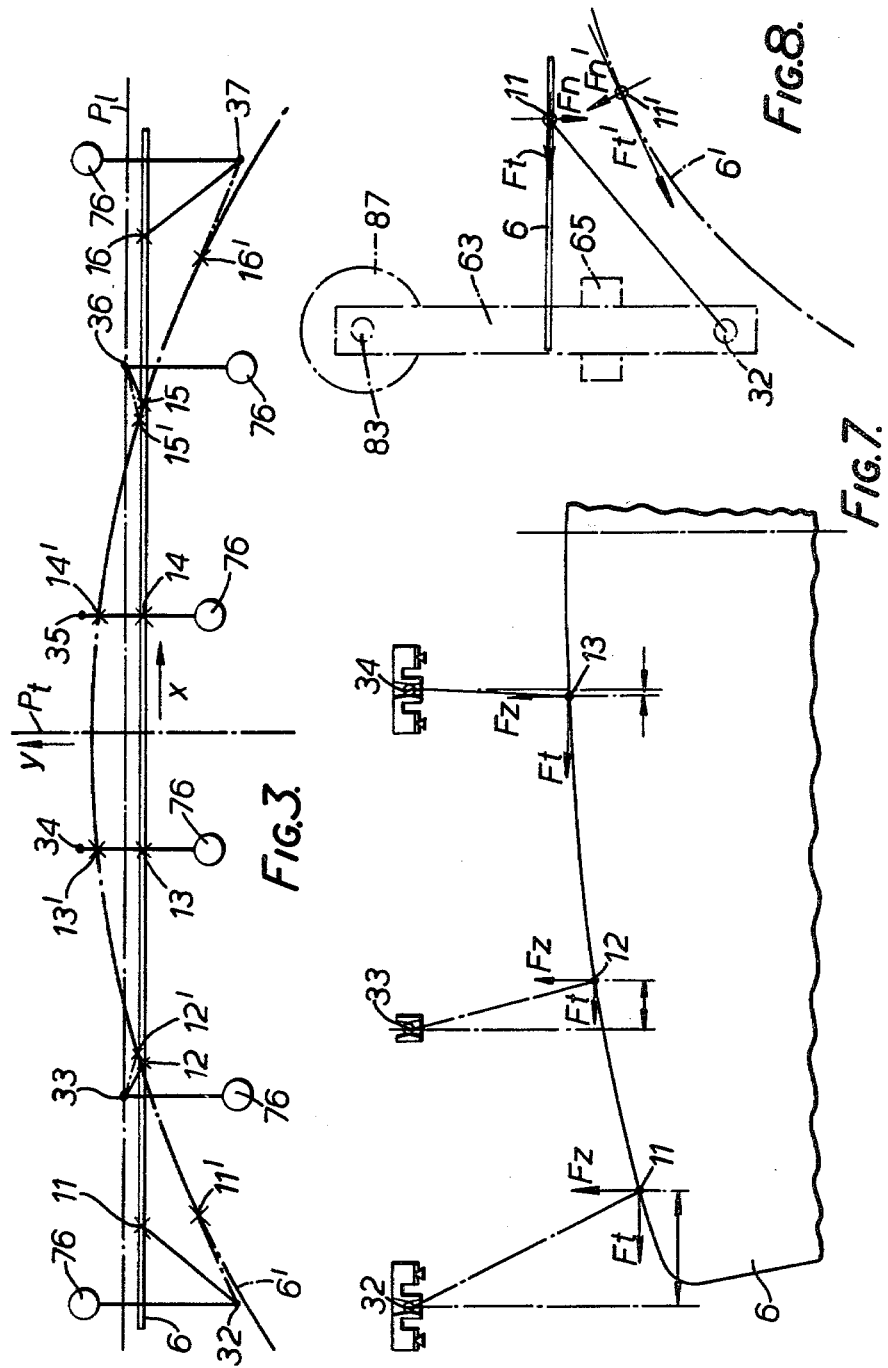

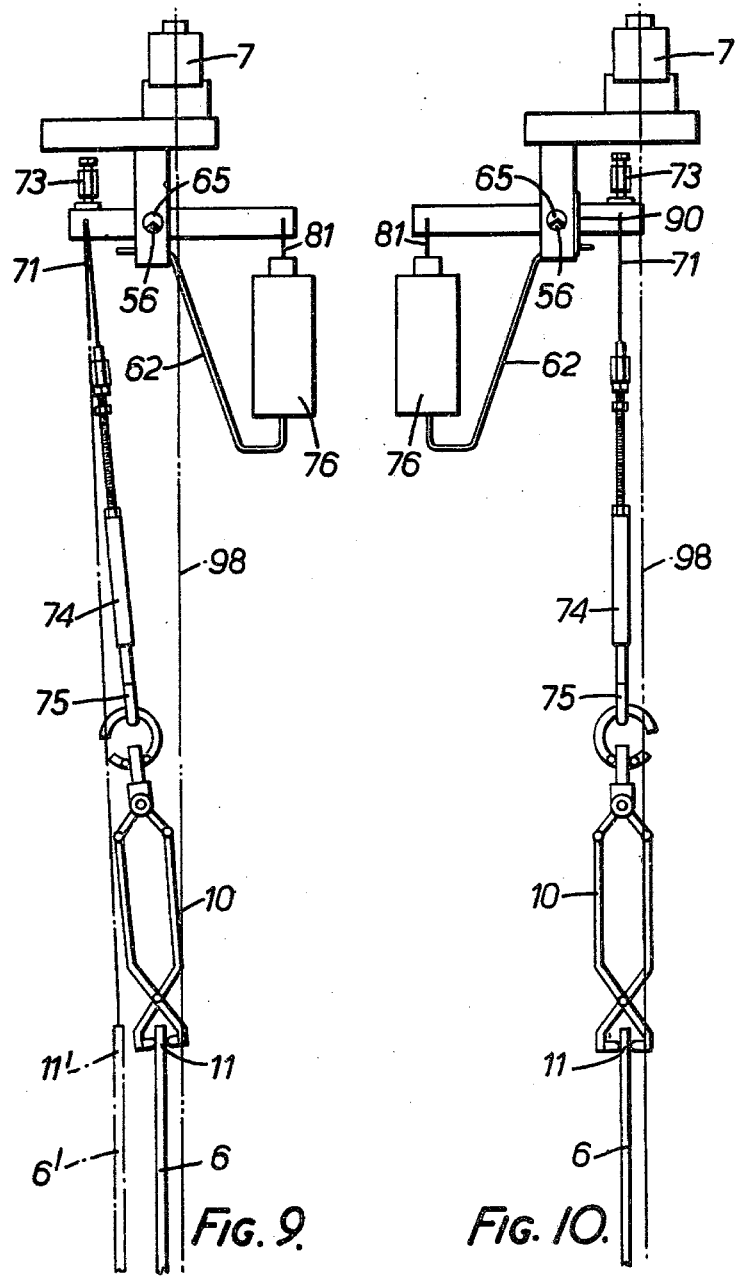

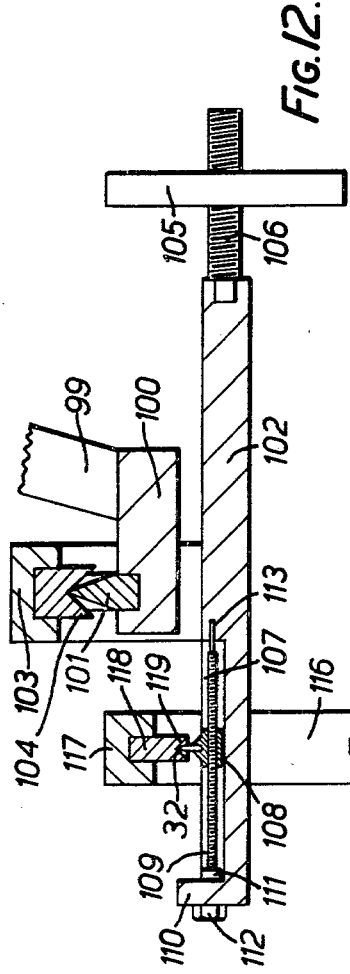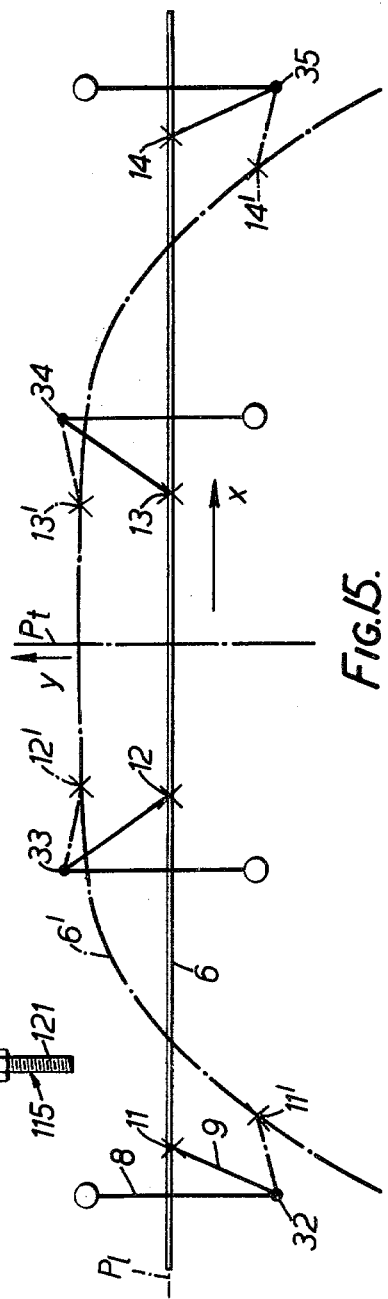

PRODUCING GLASS SHEETS OF REQUIRED CURVED SHAPE

BACKGROUND OF THE INVENTION

This invention relates to the production of curved glass sheets. In particular the invention relates to the production of glass sheets having a curved shape of a vehicle window such as a windscreen or rear window. Such curved sheets may be toughened and used singly as a window, or either toughened or annealed and then used as a component of a laminated window such as a windscreen. Other uses for the curved glass sheets are for architectural purposes for example.

It is customary to cut a flat glass sheet for a vehicle window to a required shape, dictated by the styling of the vehicle in which the window is to be fitted, to smooth the cut edges of the sheet, and then suspend the sheet from a tong bar by means of tongs whose tong points grip the upper margin of the sheet at a series of gripping points which are spaced apart along the upper margin of the sheet. The flat glass sheets are heated and then bent and/or toughened while suspended from the tongs.

When the suspended sheet is bent, usually by closing horizontally moving bending dies on to the sheet, there are problems when the tongs move to follow the change of shape of the upper margin of the sheet. When the bending dies open the tongs which have been displaced are liable to exert forces on the sheet tending to distort its shape.

There is also a tendency for a suspended bent glass to change shape after the dies have opened, mainly due to temperature changes, with the result that after cooling by toughening or annealing, the shape of the sheet has changed from the shape imposed on the sheet by the bending dies. This is allowed for in the design of the shape of the die surfaces which close on to the sheet, in order to ensure that the bent sheet has a required shape when it has cooled to ambient temperature.

United Kingdom Patent Specification No. 473,604 describes a way of suspending a flat glass sheet from a series of tongs. The suspension for some of the tongs may be balanced by means of balance weights so that the tongs exercise an endwise or sideways pull on the flat glass sheet acting in the plane of the glass in order to keep the sheet flat.

An arrangement of tongs for suspending a glass sheet for bending is the subject of United Kingdom Patent Specification No. 1,185,355, in which the tongs are suspended in pairs from horizontal bars which can swivel in such a way that when the bending dies close on to the sheet the horizontal bars rotate about vertical axes to keep the suspension points for the tongs vertically above the top edge of the glass sheet, thereby avoiding horizontal force components exerted on the glass by the tongs during and after bending.

U.S. Pat. No. 3,888,635 describes a process in which bending dies are maintained at the same temperature as the glass temperature to which the glass is heated before bending, and the glass is supported by near-vertical rollers while it is heated and being transported to the bending dies. When the glass has been bent the upper edge of the glass is gripped by tongs so that the bent glass sheet is freely suspended when the dies open. This process produces curved glass sheets, both toughened and annealed, for inclusion in laminated assemblies.

There are problems associated with distortions introduced into the glass due to forces exerted on the glass sheet, particularly when the glass is released from the dies and becomes freely suspended from the series of tongs.

There are other glass bending and toughening plants in operation known as intermittent or multistage die bending plants, in which flat glass sheets are suspended on tongs throughout bending and toughening. The products from such plants are not used for laminating.

The current trend is to use thinner glass sheets in the production of motor-vehicle windows, and thinner glass is more vulnerable to distortion introduced by forces exerted on the glass by the tongs while the glass is still hot and deformable.

It is a main object of the present invention to provide a new method and apparatus for producing a curved glass sheet in which, either throughout the processing of the sheet, or at certain stages of the processing, the sheet is suspended from a series of tongs and the forces acting on the suspended glass sheet constitute a dynamic force system which acts on the sheet in such a way as to tend to change the shape of the sheet towards a desired shape, and/or applies forces to a bent glass sheet in such a way as to assist in maintaining that bent shape during further processing of the sheet, for example toughening or annealing.

It is another object of the invention to provide a method and an apparatus for producing toughened glass sheets and annealed glass sheets on a conventional intermittent die bending plant, the shapes of which sheets are sufficiently precise to enable them to be used on a commercial scale for the production of laminated glass windows.

SUMMARY OF THE INVENTION

The invention provides a method of producing a curved glass sheet in which a hot glass sheet at forming temperature is suspended at a series of gripping locations spaced along the upper margin of the sheet. The hot glass sheet is subjected to individual forces at those gripping locations at least some of which individual forces have components out of the plane of the sheet. The magnitude and direction of each of said forces is individually selected in dependence on the weight and shape of the glass to ensure that the freely suspended hot glass sheet adapts towards a predetermined curved shape as the magnitudes and directions of the forces vary during the change of shape of the glass, and the magnitudes and directions of the forces are permitted to vary so that the influence of the total force system acting on the sheet in changing the shape of the sheet diminishes as the sheet approaches the predetermined curved shape.

In one way of carrying out the invention the suspended glass sheet is heated to forming temperature, said total force system is permitted to impel the sheet towards the required curved shape while the sheet softens during the heating, and the sheet is cooled in a manner such that it has adopted the required curved shape when it is sufficiently stiffened to be uninfluenced by the remanent forces applied at the gripping locations.

Another way of carrying out the method of the invention is characterised by bending the hot glass sheet whose shape is changing under the influence of said total force system, to a bent shape which determines a required final curved shape of the sheet, which bent shape is such that there are remanent forces at the gripping locations which act on the freely suspended bent sheet as it is cooled until it is sufficiently stiffened to be uninfluenced by those forces and has adopted the required final curved shape.

The individual forces applied to the glass at the gripping locations may be selected such that the remanent forces acting on the freely suspended bent sheet oppose any tendency of the sheet to deform from said bent shape under the influence of gravitational forces.

Yet another way of producing a curved glass sheet according to the invention, comprises heating a suspended flat glass sheet to forming temperature, and individually selecting the magnitude and direction of each of the forces applied at the gripping locations so that the flat glass sheet is strained towards a required shape by those forces and deforms towards a partially curved shape as stresses in the sheet relax.

Preferably the gripping locations are gripping points spaced along the upper margin of the sheet, and some at least of the gripping points are individually counterbalanced in a manner to maintain a predetermined distribution of the weight of the sheet amongst the gripping points during the curving of the sheet.

In the preferred embodiment the sheet is suspended from a series of suspension points which are respectively connected to the series of gripping points, at least one of the suspension points is fixed, and the rest of the suspension points are vertically movable to accommodate movement of the gripping points during curving of the sheet and are individually counterweighed to maintain said distribution of the weight of the sheet.

The suspension points may be located so that, when viewed from above, they lie on a curve approximating to the curve of the upper margin of the required curved sheet.

Two of the suspension points may be fixed and located one on each side of the centre of the sheet, the rest of the suspension points are vertically movable, and the gripping points are so located on the sheet relative to the suspension points as to determine the out-of-plane force components which are applied to the sheet at the gripping points.

In the application of the method of the invention to the thermal toughening of the glass, the glass sheet is thermally toughened by contacting the freely suspended curved sheet with a chilling medium, the individual forces continue to act on the sheet at the gripping points until the chilling medium stiffens the sheet sufficiently to be uninfluenced by those forces, and thereafter the sheet adopts its final shape as cooling continues in the chilling medium.

Immediately before the curved sheet is contacted with the chilling medium, the sheet may be heated through its thickness to a temperature higher than the temperature at which it was curved, and the individual forces applied to the sheet ensure that the sheet adopts a required final curved shape by the time the sheet has cooled to ambient temperature.

The invention also comprehends apparatus for producing a curved glass sheet, comprising a tong bar, and a series of tong suspension units located on the tong bar and spaced apart along the bar.

Each tong suspension unit has a suspension point, a hanger for a pair of tongs suspended from the suspension point, and means for independently adjusting the position of the suspension point both along and transversely of the tong bar so that the suspension points are located on a curve which is related to the required curved shape of the glass sheet. At least some of the suspension units accommodate movements of the tongs relative to the tong bar as a glass sheet suspended from the tongs is curved.

At least one of the suspension points may include means for fixing the suspension point of that unit relative to the tong bar.

Each hanger may be free to swing within a conical angle relative to its suspension point.

In one embodiment each suspension unit comprises a fulcrum fixed to the tong bar, a lever located on the fulcrum, a suspension point on one arm of the lever, and a counterweight on the other arm of the lever.

Preferably the fulcrum is a knife-edge fulcrum, and the lever has an inverted V-shaped bearing which locates the lever on the fulcrum.

Each suspension point may comprise a cup-shaped bearing fitted in a lever, and each hanger may comprise a flexible suspension which has at its upper end a ball which seats into the cup-shaped bearing and which is attached at its lower end to a suspension hook for a pair of tongs.

The fulcrum may be pivotable relative to the tong bar to swing the lever about a vertical axis.

At least one suspension unit may include means for restricting pivotal movement of said one arm of the lever which carries the suspension point.

Preferably the means for restricting pivotal movement comprises a shackle positioned over said one arm of the lever and fixed relative to the tong bar to act as a stop restricting pivotal movement of that arm.

BRIEF DESCRIPTION OF THE DRAWINGS

Some embodiments of the invention will now be described, by way of example, with reference to the accompanying drawings in which:

FIG. 3 illustrates diagrammatically the spatial relationship between suspension points of the tong suspension units and gripping points where the tong points grip the glass sheet, when the sheet is flat and when it is curved, FIG. 7 is a front view of part of the flat glass sheet of FIGS. 2 and 3, showing the force components in the plane of the sheet at the gripping points, FIG. 8 is a plan view of one of the gripping points illustrating the horizontal in-plane and out-of-plane force components acting on the sheet when flat and when curved, FIG. 9 is a diagrammatic side view of the first tong suspension unit and tongs in the direction of arrow IX on FIGS. 2 and 6 illustrating in full lines the position of the glass sheet and the hanger and tongs when the sheet is flat, and in broken lines the position of the sheet, hanger and tongs when the sheet is bent, FIG. 10 is a view similar to FIG. 9 of the second tong suspension unit in the direction of arrow X on FIGS. 2 and 6, FIG. 12 is a diagrammatic side elevation of another form of suspension unit according to the invention, FIG. 15 shows, in the same way as FIG. 3, the spatial relationship between suspension points and gripping points when processing a glass sheet in the apparatus of FIGS. 13 and 14.

DESCRIPTION OF THE PREFERRED EMBODIMENT

Figure 1:
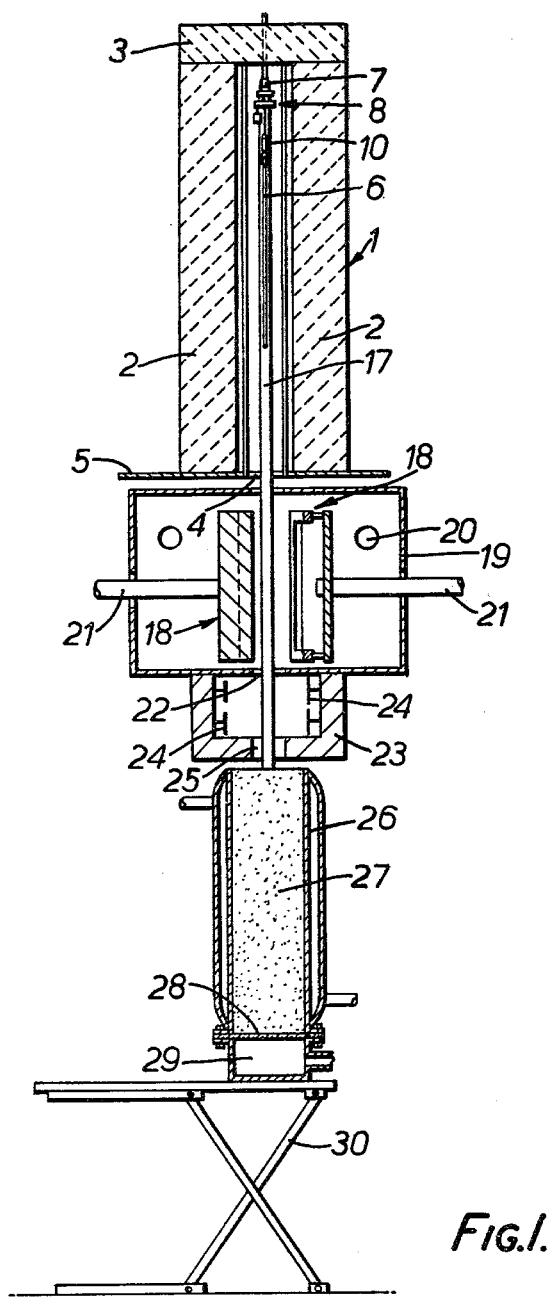
FIG. 1 illustrates diagrammatically a vertical section through glass bending and toughening apparatus to which the invention may be applied.

Referring to the drawings, the method and apparatus of the invention may be used in vertically disposed bending and toughening apparatus of the kind illustrated in FIG. 1.

A vertical toughening furnace indicated generally at 1 has side walls 2 and a roof 3 which are made of the usual refractory material. The bottom of the furnace is defined by an elongated aperture 4 in a baseplate 5 on which the furnace is supported. A movable shutter, not shown, is provided in known manner to close the aperture.

Figure 2:
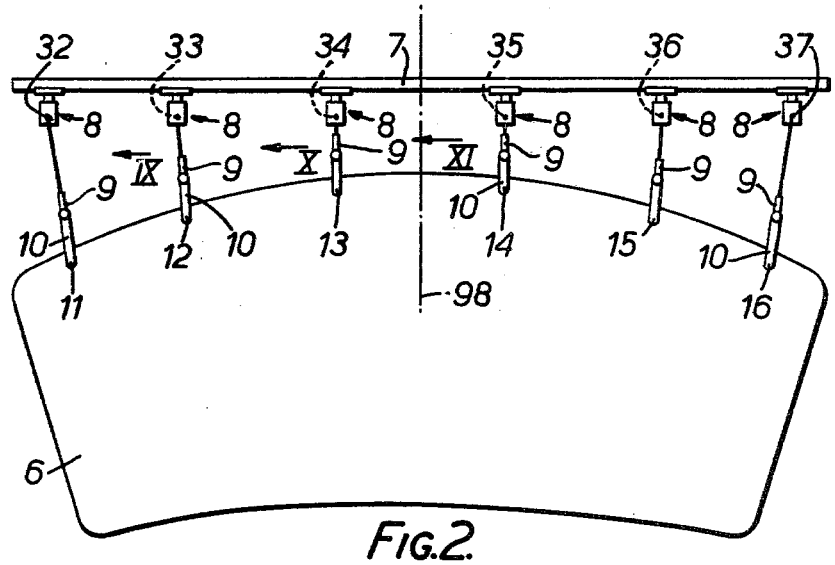
FIG. 2 is a diagrammatic front view of a flat glass sheet suspended from a series of tong suspension units according to the invention fixed to a tong bar for bending and toughening in the apparatus of FIG. 1.

A sheet of soda-lime-silica glass to be bent to a curved shape of a motor vehicle windscreen is cut to the required shape, illustrated in FIG. 2, edge-finished to smooth the cut edges, and then suspended from a tong bar 7 by a series of six tong suspension units, indicated generally at 8 which are located on the tong bar 7 and are spaced apart at predetermined locations symmetrically three on either side of the centre of the tong bar as shown in FIG. 2. Each tong suspension unit has a hanger 9 for a pair of tongs 10, and the tong points fixed in the jaws of the tongs 10 grip the upper margin of the glass sheet 6 at a series of gripping points 11, 12, 13, 14, 15 and 16 spaced along the upper margin of the glass sheet. The gripping points 11 to 16 on the flat glass sheet 6 are also shown in FIG. 3. The pairs of tongs 10 are of conventional design and are closed by the weight of the glass sheet 6 gripped between the tong points.

The tong bar 7 is suspended from a conventional hoist, not shown, and runs on vertical guide rails 17 which extend downwardly from the furnace to guide the lowering and raising of the tong bar 7.

A pair of bending dies 18 is located in the path of the glass sheet when it is lowered from the furnace after being heated to bending temperature in the furnace. The dies are housed in a bending chamber 19 which is heated by hot gas which enters through ducts 20. The interior of the chamber 19 and the bending dies 18 are maintained at the same temperature as the temperature of the hot glass sheet 6 as it enters the chamber 19.

The dies 18 are mounted on rams 21, and matching curvature of the faces of the dies 18 defines the curved shape which the glass sheet 6 has immediately after opening of the dies. The tong bar 7 is mounted so that its centre lies in the vertical central plane of symmetry of the dies, and the centre line of the suspended glass sheet also lies in that plane.

An exit aperture 22 in the floor of the heated bending chamber 19 leads into a boost heating chamber 23 mounted beneath the floor of the chamber 19. Electrical heaters 24 are mounted on the walls of the chamber 23 facing the surfaces of the bent glass sheet as it is lowered from the bending chamber 19. The guide rails 17 extend downwardly through the boost heating chamber 23 and during its downward passage through the chamber 23 the bent glass sheet is heated through its thickness to a temperature higher than the temperature at which it was bent, prior to quenching of the glass by contacting its surfaces with a chilling medium.

The guide rails 17 extend downwardly to an exit 25 in the floor of boost heating chamber 23 towards the top of an open-topped rectangular tank 26 which contains the chilling medium, which is a gas-fluidised bed 27 of particulate refractory material, for example γ-alumina or aluminium trihydrate, which is maintained in a quiescent uniformly expanded state of particulate fluidisation by uniform gas flow upwardly from a micro-porous membrane 28 which is fixed across the base of the tank 26 above a plenum chamber 29 to which fluidising gas is supplied. The tank 26 is mounted on a scissors-lift table 30 and is lowered for loading and unloading of a glass sheet to be processed.

The six gripping points 11 to 16 are precisely located at points on the upper margin of the glass sheet and, in the example illustrated, are symmetrically disposed, three on each side of the centre line of the glass sheet. The way in which the gripping points are determined will be described later with reference to a specific example. The tong suspension units 8 are similarly symmetrically disposed to either side of the centre of the tong bar 7 so that they are also in effect symmetrically disposed on either side of the centre line of the glass sheet.

Each of the tong suspension units 8 has a suspension point from which its hanger 9 is suspended. Considered from the left-hand side of the glass sheet as illustrated in FIGS. 2 and 3 there is a series of six suspension points 32, 33, 34, 35, 36 and 37, three on each side of the centre line of the glass sheet. All the suspension points are vertically movable and counterweighted and are adjustable in position transversely of the glass sheet, as will be described. The suspension points 33 and 36 may have restricted vertical movement. The suspension points are preferably so located relative to the tong bar that the hanger and tongs suspended from each of the suspension points are at a small angle to the vertical, for example 10° or less.

The construction of each of the suspension units is the same. The first unit having the suspension point 32 is illustrated in detail in FIGS. 4 and 5.

The tong bar 7 is a solid beam and for each suspension unit has two holes through which pass bolts 38 and 39. The bottom ends of the bolts are threaded into key blocks 40 and 41 beneath the bottom surface of the tong bar.

The key blocks 40 and 41 slide in a keyway 42 in a suspension block 43 of rectangular form. The block 43 has upper edge flanges 44 which fit around the side faces of the tong bar 7. When the key blocks 40 and 41 have been slackened by loosening the bolts 38 and 39, the location of the suspension block 43 on the tong bar 7 can be adjusted parallel to the tong bar by sliding the suspension block 43 relative to the key blocks 40 and 41. When the required position has been achieved the bolts 38 and 39 are tightened and the key blocks tighten the suspension block upwardly against the bottom face of the tong bar 7. Welded to the lower face of the suspension block 43 is a transverse block 45 which is formed with a downwardly opening keyway 46 in which there slides a key block 47 which has a foot 48 which projects downwardly through the open bottom of the block 45.

A bridge piece 49 of inverted U-shape has a cross member 50 which is formed with a recess to receive the foot 48 of the slider 47 and is held to the slider 47 by a bolt 51 which is threaded upwardly into a central hole in the slider 47. The cross piece 50 is capable of rotation relative to the slider 47 and the block 45. The position of the slider 47 in the block 45 and the angular position of the cross member 50 relative to the block 45 is fixed by tightening the bolt 51.

The bridge piece 49 has two legs 52 and 53 which have recesses near their bottom ends in which there is fitted a fulcrum member 54 which extends across the bottom of the two legs 52 and 53 and is fixed to those legs by bolts 55. The fulcrum member has two upstanding knife-edges 56 and 57 which are located within parts of the legs 52 and 53 of U section between side flanges 58 and 59 of leg 52 and side flanges 60 and 61 of leg 53.

A retainer wire 62, whose function will be described, is fixed to the centre of the fulcrum member 54. A lever 63 is located on the fulcrum. The lever is a machined block of rectangular cross section and has a circular aperture 64 extending from side to side in which there is welded a cylindrical bearing member 65 which is cut away to form an inverted V-shaped bearing 66 which locates the lever 63 on the fulcrum constituted by the two knife-edges 56 and 57. The knife-edges 56 and 57 engage in the bearing 66 to either side of the lever. A locating plate 67 is welded to the top of the lever 63 above the bearing member 65. By rotating the bridge piece 49 the fulcrum is pivotable relative to the tong bar to swing the lever about a vertical axis. At one end of the lever 63 there is the suspension point 32 for the hanger 9. The suspension point is defined by a cup-shaped bearing 68 which is fitted in an aperture 69 extending down through the lever. Through the bottom of the bearing 68 there is a conical aperture 70 which diverges downwardly. A flexible suspension for the hanger 9 comprises a twisted wire cable 71 on which there is threaded a bearing ball 72 which fits snugly into the cup-shaped bearing 68. The top end of the cable 71 is firmly held in a clamp 73 against which the ball 72 bears. The lower end of the cable is clamped to the upper end of a hook member 74 which is formed at its lower end with a hook 75 from which the tongs 10 are suspended. The use of a flexible cable suspension 71 and the downwardly opening conical shape of the aperture 70 ensure substantial unrestricted movement of the hanger 9 relative to the lever 63 within the conical angle of the aperture 70.

A counterweight, indicated generally at 76, is suspended from the other arm of the lever 63. A shaped aperture is formed downwardly through the other end of the lever, which aperture comprises an upper bearing part 77 and a lower downwardly diverging conical part 78. A weight carrier comprising a circular base 79 fixed to the bottom of a rod 80 is suspended from that end of the lever 63 by a flexible suspension comprising a short length of twisted wire cable 81, the lower end of which is clamped by a grub screw 82 into the upper end of the rod 80, and the upper end of which carries a ball 83 which bears against a terminal head 84 on the cable 81. The ball 83 rests on a conical bearing surface 85 at the bottom of the upper part 77 of the aperture through the lever.

A bore 85 is drilled upwardly into the rod 80 from the bottom and the retaining wire 62 which is fixed to the fulcrum piece 54 has an upwardly extending end 86 over which the bore 85 fits loosely. The wire 62 serves to retain the weight carrier and its weights if the suspension cable 81 for the weight carrier should fail in use. Weights 87, which have radial slots which can pass around the cable 81, are loaded on to the carrier 79, 80 to determine the value of the counterweight.

When assembling the suspension unit the hanger 9 for the tongs with the cup-shaped bearing 68 threaded on the cable 71 is fitted in position in the aperture 69 by passing the cable through a slot 88 cut into the end of the lever, and then pressing the bearing member 68 downwardly into its aperture 69. Similarly, the suspension cable 81 for the counterweight passes through a slot 89 cut in the other end of the lever leading into the aperture 77, 78. When the suspension unit has been assembled and is in position on the tong bar, but before a glass sheet is gripped by the tongs, the lever 63 is weighed down by the counterweight but pivoting is restricted by abutment of the plate 67 against the flanges 59 and 61.

By slackening the bolts 38, 39 and 51 the exact position of the suspension point 32 can be determined. This suspension point is considered to be the point where the ball 72 engages in the mouth of the aperture 70. The adjustment is carried out by sliding the block 43 on the key blocks 40 and 41, by sliding the slider 47 in the key way 46, and if necessary by rotation of the cross piece 50 about the bolt 51. When the suspension point 32 is in the desired location relative to the tong bar the bolts 38, 39 and 51 are tightened.

The third, fourth and sixth suspension units having suspension points 34, 35 and 37 are identical to the unit just described with reference to FIGS. 4 and 5, the limits of rotation of the lever 63 being determined by the abutment of the plate 67 on the flanges 59, 61 or 58, 60 of the legs of the bridge which carries the fulcrum. The suspension points 33 and 36 are however fixed by restricting pivotal movement of the arm of the lever 63 which carries the suspension point. The fixing means comprises a removable shackle 90 of inverted U-shape which is indicated in chain dotted lines in FIG. 5. This shackle is positioned over the arm of the lever which carries the pivot point 33 or 36 and is fixed to the bolts 55 which fix the fulcrum member 54 in position. The lower face of the upper cross member of the shackle 90 has a knife-edge 91 which acts as a stop preventing upward pivotal movement of the arm of the lever carrying the suspension point. The counterweight 76 is effective to maintain the lever arm in abutment against the knife-edge 91 so fixing the position of the suspension point 33 or 36 respectively.

Figure 6:
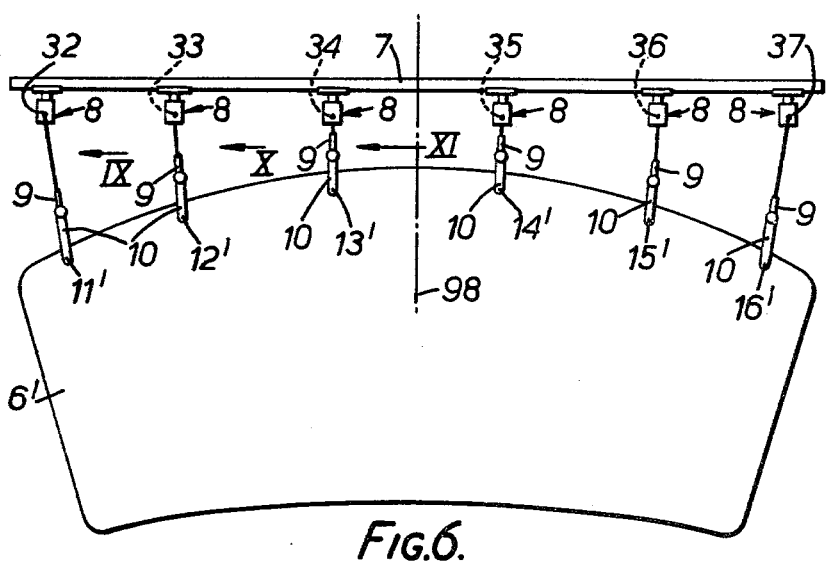
FIG. 6 is a diagrammatic front view, similar to FIG. 2, of the glass sheet when bent to a curved shape.

Variations in the lengths of the cable 71 and the hanger 74 for the tongs are necessary to accommodate the shape of the upper edge of the glass sheet as shown in FIGS. 2 and 6.

FIG. 3 shows how the first and sixth tong suspension units are fixed to the tong bar with their suspension points 32 and 37 in front of the glass sheet 6, when viewed from the front face as in FIG. 2, and their counterweights 76 behind the sheet 6. The third and fourth suspension units are fixed to the tong bar with their suspension points 34 and 35 behind the sheet 6 and their counterweights 76 in front of the sheet. The fixed suspension units, namely the second and fifth units, are adjusted so that their suspension points 33 and 36 lie just behind the sheet 6 and their counterweights are in front of the sheet.

The magnitude and direction of the individual force applied to the flat glass sheet at each of the gripping points 11 and 16 is determined by the weight of the hangers and tongs, the positions of the suspension points 32 and 37 relative to the gripping points 11 and 16 and the mass of the counterweights of those of the suspension unit which are not fixed. The mass of the counterweight of each suspension unit which is free determines the vertical component of the force applied at the gripping point attached to that suspension unit. As the freely suspended hot glass sheet adapts to a predetermined curved shape, the positions of the gripping points relative to the suspension points change and the magnitudes and directions of the forces applied to the glass at the gripping points vary during the change of shape of the glass. This means that the influence of the total force system acting on the glass sheet in changing the shape of the sheet diminishes as the sheet approaches the predetermined curved shape.

Should the tong bar 7 rotate, or distort in a vertical plane, by a small amount such as would cause some vertical displacement of the suspension units 8 there is compensatory vertical movement of the suspension points 32, 34, 35 and 37 due to pivoting of the counterbalanced levers carrying those suspension points so that virtually the same force continues to be exerted on the glass sheet at each of the gripping points. The suspension of the glass is thus effectively decoupled from the tong bar for disturbances such as would be produced by rotation or distortion of the tong bar.

Because in each of the suspension units the suspension point, say suspension point 32 of the first unit, the fulcrum 56, 57 and the point where the counterweight 76 is suspended from the other arm of the lever, all lie in a straight line, there is a state of neutral balance with the glass. This means that if the angle of the lever 63 changes, either due to movement of the tong bar due to bowing or sagging or due to movements of the glass during bending from flat to curved shape, there is no variation in the vertical force components exerted on the glass at the gripping points.

The location of gripping points 11 to 16 relative to the suspension points 32 to 37 can be expressed as horizontal distances x and y in directions at right angles as indicated in FIG. 3. When determining the settings of the suspension points and the gripping points to be employed in setting up the plant for the production of a particular shaped glass sheet, an iterative trial and error process is employed.

In one way of doing this the gripping points 11 to 16 are initially selected by, in effect, dividing the flat glass sheet into areas of equal weight, each to be gripped by one of the tongs 10. Each of the tongs 10 is positioned so that its gripping point lies directly above the centre of gravity of the area of the glass sheet whose weight is to be carried by that tongs.

The counterweights are then selected so that there is an equal distribution of the weight of the sheet amongst the suspension units. The positions of the suspension units on the tong bar are then adjusted so that suspension points 32 to 37 lie approximately above the required curvature 6' of the upper edge of the glass sheet when bent, and so that the hanger and tongs suspended from each of the suspension points lie in a vertical plane normal to the plane of the glass sheet.

With this setting the glass sheet is heated to forming temperature which in this embodiment is the bending temperature to be employed in production. For example, for bending and toughening a glass sheet 2.3 mm thick the bending temperature would be in the range of 550° C. to 650° C. A typical bending temperature for glass 2.3 mm thick is 600° C.

The bending dies 18 in the bending chamber 19 are maintained at this bending temperature, and after the hot glass sheet has been bent between the bending dies, dies open and the hot bent glass sheet suspended from the tongs is lowered through the boost heating chamber 23 and into the fluidised bed of chilling medium in the tank 26.

In the boost heating chamber 23 the hot bent glass sheet is heated from its bending temperature to a quenching temperature which may be in the range 620° C. to 720° C. For a 2.3 mm thick glass sheet which has been bent at a bending temperature of 600° C., the quenching temperature to which the sheet is heated as it passes downwardly to the boost heating chamber 23 may be 650° C. The quenching temperature depends on the amount of stress to be induced in the glass.

When the bent and toughened glass sheet, now suspended in the fluidised bed, has cooled sufficiently to be handled, it is removed from the bed and its shape is checked against a checking fixture either for overbending or underbending of the upper edge of the sheet.

If overbending of the upper edge is evident, the suspension points 32 to 37 are moved in the y direction a little closer to tong bar. If there is insufficient bending of the upper edge, the tong suspension points 32 to 37 are adjusted in the y direction so as to be a little further away from the tong bar.

When an appropriate setting for obtaining approximately the correct shape for the upper edge of the sheet has been found by repeated processing of glass sheets and adjustment as described above, the shape of the bottom edge is checked. If there has been overbending of the bottom edge, the gripping points 11 to 16 and the suspension points 32 to 37 may be moved further apart in the x direction towards the sides of the glass, and/or the counterweights may be adjusted to decrease the amount of the weight of the glass sheet carried by the tongs suspended from the suspension points 34 and 35, and to increase the amount of weight carried by the outer tongs which are suspended from the points 32 and 37.

If there has been underbending of the bottom edge of the glass sheet, the gripping points and the suspension point may be moved in the x direction nearer together towards the centre of the glass, or the weight distribution is changed by adjustment of the counterweights to increase the weight carried by the tongs suspended from the points 34 and 35 and to decrease the weight carried by the outer tongs. These steps are then repeated until the bottom edge shape is approximately correct.

The top edge shape is then re-checked and further small adjustments may be made by moving some or all of the suspension points 32 to 37 towards or away from the tong bar in the y direction to correct any deviations now found.

These steps are repeated with a succession of glass sheets until a setting is achieved which gives the approximately correct top and bottom edge shapes of the bent glass.

The glass sheet is then also checked to make sure that there are no tendencies for the upper edge of the glass sheet to bulge or flatten between the gripping points. Such faults may arise during heating of the glass sheet in the furnace 1 and would not be eliminated by bending between the bent dies.

Any bulges in the top edge of the bent glass sheet can be corrected by making the same adjustments of the positions of the gripping points and suspension points as just described to correct underbending of the bottom edge. However, if adjustments to correct underbending of the bottom edge have already been made it is more appropriate to correct bulges in the top edge by adjusting the inclinations of the tongs and hangers to the vertical as viewed from the front in FIG. 2. This increases tension in the upper edge of the sheet by a suitable amount.

Any flattening of the top edge can be corrected by making the same adjustments as described above for correcting underbending of the bottom edge. If such adjustments of the gripping points and suspension points towards the centre of the glass or adjustments of the weight distribution, are not appropriate, the inclinations of the hangers and tongs to the vertical, as viewed from the front in FIG. 2, are adjusted so as to decrease the tension or generate compression in the upper edge of the sheet by a suitable amount.

By proceeding in this way the bending dies are used to give a predetermined curved shape to the glass sheet which is such that after subsequent processing of the bent glass sheet, in this instance boost heating and quenching, the sheet adopts a final required shape as the glass cools towards ambient temperature.

The bent glass sheet becomes particularly vulnerable to the forces acting on it when it is boost heated to a quenching temperature higher than its bending temperature. For example, the glass sheet may be particularly subject to gravitational forces tending to change its shape away from the shape to which it has been bent. The remnant forces still applied to the glass at the gripping points may therefore be such that they oppose any tendency of the sheet to deform from said bent shape under the influence of gravitational forces.

The initial setting of the gripping points relative to the suspension points takes this into account in such a way that the horizontal force components acting at the gripping points both tangential to and normal to the bent glass sheet militate against any tendency of the suspended sheet to distort due to gravitational forces.

The remnant forces acting on the glass at the gripping points therefore contribute to the total force system acting on the glass after bending in such a way as to ensure that the bent sheet eventually adopts the required final shape as it is quenched and cools to ambient temperature.

When the desired setting of the gripping points and suspension points relative to the tong bar has been achieved, the locations of suspension points relative to the gripping points to which they are connected by a respective hangers with flexible connections and tongs, are such that forces applied to the upper margin of the flat glass 6 at the gripping points 11 to 16 have, acting in the plane of the sheet 6 as shown in FIG. 7, vertical components $F_z$ which support the weight of the sheet, and horizontal components $F_t$ in the plane of the sheet which act principally to maintain the smooth curvature of the sheet, particularly its top edge, while it is heated and after it is bent.

The horizontal in-plane components $F_t$ as are shown acting outwardly in FIG. 7 to maintain the upper edge of the sheet in tension, but the settings may be such that those components would act inwardly to counteract any tendency for the upper edge of the sheet to flatten. The component $F_t$ may act to maintain the upper edge of the sheet in tension in some places and in compression in other places while the sheet is being processed.

The forces acting at the gripping points also have horizontal components $F_n$ acting out of the plane of the sheet normal to that plane, as described with reference to FIG. 8.

FIG. 8 illustrates the force components in the plane of the glass and out of the plane of the glass at the gripping points 11 when the sheet is flat and when it is curved. These components are best considered as a component $F_t$ acting in a tangent plane to the glass at the gripping point 11 and a component $F_n$ acting out of the plane of the glass normal to the tangent plane at the gripping point. The components $F_t'$ and $F_n'$ act on the bent glass sheet 6' when the gripping point is positioned at 11'.

In this example relative positions of the suspension point 32 and the gripping point 11 on the flat sheet 6 are such that the out-of-plane force component $F_n'$ acting on the bent sheet at each of the gripping points when the bending dies open is a small force. These small forces continue to act on the freely suspended hot bent glass sheet, which is in a deformable state and is being lowered through the boost heating chamber 23 into the fluidised bed 27, in such a way that by the time the bent sheet has been toughened and is cooling to ambient temperature in the fluidised bed, the glass sheet has adopted its final curved shape and the glass is so cool that no further change of shape can take place due to thermal contraction.

The out-of-plane force components $F_n'$ are thus part of a dynamic total force system which acts on the glass throughout its processing, both while its viscosity is such that the glass is susceptible to deformation by the individual forces acting on it at the gripping points and by bending moments produced in the glass sheet by gravitational forces.

The influence of the total force system acting on the sheet in changing the shape of the sheet diminishes as the sheet approaches a required predetermined curved shape, and after the glass has cooled sufficiently to be no longer capable of such deformation there would usually be slight changes in shape due to thermal contraction. This is true whether the glass is being processed in an annealing cycle or in a thermal toughening cycle.

The production of a thermally toughened glass sheet having a required curved shape by the method of the invention can be illustrated by reference to the use of the apparatus of FIG. 1 for bending the flat glass sheet 6 of FIGS. 2 and 3 to the curved shape 6' of FIGS. 3 and 6, followed by boost heating of the bent sheet as it is lowered through the chamber 23, and the thermal toughening of the curved sheet by quenching the sheet in the fluidised bed 27.

The flat glass sheet 6 is of soda-lime-silica glass and is 703 mm wide between the top corners of the sheet and 645 mm high at its centre line 98. The sheet is 2.3 mm thick and weighs 5 kg.

The scissors-lift table 30 is lowered and the tong bar 7 is lowered to the bottom of the guide rail 17 and the upper margin of the glass sheet 6 is gripped by the six pairs of tongs 10.

The positions of the suspension points 32, 33, 34, 35, 36 and 37, which are set by longitudinal and transverse positional adjustment of the tong suspension units on the tong bar can be expressed, as indicated in FIG. 3, by their distance in the horizontal x direction from the transverse central plane of symmetry $P_t$ of the tong bar 7, and by their distance in the horizontal y direction from the longitudinal central plane of symmetry $P_1$ of the tong bar 7. The settings were determined by the iterative setting-up procedure described above.

The suspension points 32 and 37 are located at an x distance of 716 mm on either side of the plane $P_t$ and at a y distance of 87 mm forward of the plane $P_1$. The hanger length from the suspension points 32 and 37 to the gripping points 11 and 16 is 660 mm.

The suspension points 33 and 36 are located at an x distance of 459 mm on either side of the plane $P_t$ and lie in the plane $P_1$ immediately below the longitudinal centre line of the tong bar 7. The hanger length from the suspension points 33 and 36 to the gripping points 12 and 15 is 590 mm.

The suspension points 34 and 35 are located at an x distance of 143 mm on either side of the plane $P_t$ and at a y distance of 28 mm behind the plane $P_1$. The hanger length from the suspension points 34 and 35 to the gripping points 13 and 14 is 550 mm.

The position of the gripping points 11, 12, 13, 14, 15 and 16 can be expressed by their distance in the horizontal x direction from the vertical centre line 98 of the glass sheet which lies in the vertical central plane of symmetry $P_t$ of the tong bar and in the vertical central plane of symmetry of the bending dies 18. The gripping points 11 and 16 are at an x distance of 619 mm on either side of the centre line 98, the gripping points 12 and 15 are at an x distance of 414 mm on either side of the centre line 98, and the gripping points 13 and 14 are at an x distance of 143 mm on either side of the centre line 98. With this setting the flat glass sheet 6 is freely suspended 4 mm in front of the plane $P_1$ as indicated in FIG. 3.

All the hangers and tongs of the first, second, fifth and sixth suspension units are initially inclined at a small angle to the vertical as seen from the front, exaggerated in FIG. 2, and as seen from the side, as shown in full lines in FIGS. 9 and 10.

Figure 11:
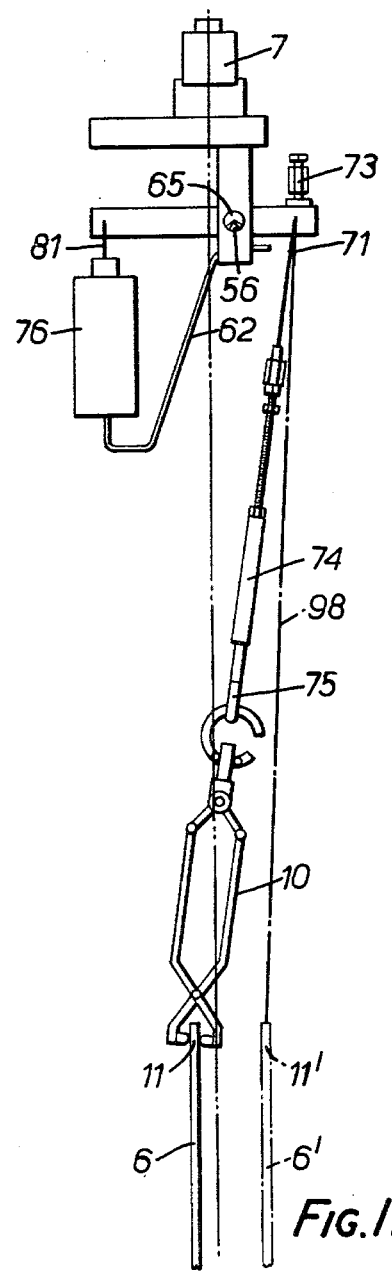
FIG. 11 is a view similar to FIG. 9 of the third tong suspension unit in the direction of arrow XI on FIGS. 2 and 6.

The hangers and tongs of the third and fourth suspension units are initially vertical when viewed from the front, and are at a small angle to the vertical as seen from the side, exaggerated in FIG. 11.

The hangers and tongs of the first and sixth suspension units are inclined inwardly in the x direction towards the centre line 98 at an angle of 8.5° to the vertical as shown in FIG. 2 and are inclined rearwardly in the y direction at an angle of 7.2° to the vertical as shown in FIG. 9.

The hangers and tongs of the second and fifth suspension units are inclined inwardly in the x direction towards the centre line 98 of the glass sheet at an angle of 4.4° to the vertical as shown in FIG. 2 and are inclined forwardly in the y direction at an angle of 0.4° to the vertical as shown in FIG. 10.

The hangers and tongs of the third and fourth suspension units are inclined forwardly in the y direction at an angle of 3.3° to the vertical as shown in FIG. 11. The counterweights 76 of the second and fifth suspension units were over-weighted so as to hold the lever arms carrying the suspension points 33 and 36 in abutment against the knife edges 91 of the shackles 90 which are fixed over the levers 63 of those suspension units.

The counterweights of the first and sixth suspension units were loaded so that the vertical component of force Fz acting at each of the gripping points 11 and 16 was 5.5 N.

The counterweights of the third and fourth suspension units were adjusted so that the vertical component of force Fz acting at each of the gripping points 13 and 14 was 11 N. The vertical component of force Fz acting at each of the gripping points 12 and 15 was therefore 8.5 N.

The force components Ft were 0.82 N directed outwardly towards the sides of the glass sheet at gripping points 11 and 16, and 0.65 N directed outwardly to the sides of the glass sheet at gripping points 12 and 15. There are no force components Ft at gripping points 13 and 14. The overall effect of these force components Ft contributed to maintaining the upper margin of the suspended glass sheet under tension.

The out-of-plane force components Fn normal to the plane of the suspended flat glass sheet were 0.7 N forwardly at gripping points 11 and 16, 0.06 N rearwardly at gripping points 12 and 15 and 0.64 N rearwardly at gripping points 13 and 14.

The individual selection of the magnitude and direction of each of the forces applied at the gripping points result in the flat glass sheet being strained towards a required shape by those forces and deforming towards a partially curved shape as the stresses in the sheet relax.

The hoist is then operated to raise the suspended flat glass sheet into the furnace 1 which is maintained at 850° C. The glass sheet is rapidly heated to bending temperature near to its softening point, preferably at a temperature in the range 550° C. to 650° C., for example 600° C. As the glass softens in the furnace the in-plane force in its upper margin due to the force components Ft and components of bending movements in the glass sheet itself, militate against any tendency of the upper edge of the sheet to distort by bulging or flattening between the gripping points. The total force system acting on the glass sheet as it begins to soften including the out-of-plane force components Fn acting in conjunction with the forces due to the weight of the glass, ensure that the freely suspended hot glass sheet adapts to a predetermined curved shape as the magnitudes and directions of the forces vary during the change of shape of the glass. Movement of the side regions of the sheet forwardly begins, simultaneously movement of the central region of the sheet rearwardly, as the hangers and tongs begin to pivot at their suspension points towards their final positions. The nature of the flexible suspensions of the hangers and tongs from the ball and socket suspension points illustrated in FIGS. 4 and 5, freely permits the magnitudes and directions of the forces to vary.

By the time the glass sheet has been heated uniformly in the furnace to the required bending temperature, the glass sheet has assumed a predetermined intermediate smooth curved shape.

The shutter closing the aperture 4 is then opened and the hot shaped glass sheet is lowered by the hoist to a position between the opened bending dies. The dies close on to the partially shaped sheet to bend the sheet to a required curved shape 6'. The hangers and tongs swing to bring the gripping points to, or very close to, their final positions 11', 12', 13', 14', 15' and 16'.

After a residence time between the closed dies 18 which, because of the preliminary partial shaping, is relatively short, for example between 0.5 and 2 seconds, the dies open and the hot curved glass sheet 6′ becomes freely suspended between the dies. The glass sheet is still at bending temperature, in this example 600° C.

FIG. 6 illustrates, as viewed from the front, the final positions of the hangers 9 and tongs 10 gripping the curved sheet 6′. The final disposition of the hangers and tongs suspended from suspension points 32, 33, 36 and 37 is shown in broken lines in FIGS. 9 and 10. There is no appreciable swing of the hangers and tongs suspended from the suspension points 34 and 35, away from their inclinations indicated in FIG. 11.

The relative location of the suspension points and the gripping points are now such that the force components $F_t'$, together with components of the bending movements in the glass sheet itself, maintain the smooth curvature of the upper edge of the bent sheet.

The gripping points 11′ and 16′ are now located at an x distance of 607 mm on either side of the plane $P_t$ in which the centre line 98 of the glass sheet lies, and a y distance of 55 mm in front of the plane $P_1$.

The gripping points 12′ and 15′ are located at an x distance of 405 mm on either side of the plane $P_t$ and at a y distance of 4 mm in front of the plane $P_1$.

The gripping points 13′ and 14′ are located at an x distance of 143 mm on either side of the plane $P_t$, that is the same distance from the plane $P_t$ as the suspension points 34 and 35. The gripping points 13′ and 14′ are at a y distance of 18 mm behind the plane $P_1$, that is when viewed in plan 10 mm in front of the suspension points 34 and 35.

After bending, the hangers and tongs of the first and sixth suspension units are inclined inwardly in the x direction towards the centre line 98 at an angle of 9.5° to the vertical, an increase of 1.0°; and there are inclined rearwardly in the y direction at an angle of 2.8° to the vertical, after a swing towards the vertical of 4.4°, as shown in FIG. 9.

The hangers and tongs of the second and fifth suspension units are, after bending of the sheet, inclined inwardly in the x direction towards the centre line 98 of the glass sheet at an angle of 5.3°, an increase of 0.9°; and remain inclined forwardly in the y direction at an angle of 0.4° to the vertical.

After bending of the sheet the hangers and tongs of the third and fourth suspension units remain vertical when viewed from the front and are inclined rearwardly in the y direction at an angle of 1.04° to the vertical, a swing of 2.3° towards the vertical as shown in FIG. 11.

The increase in the inward inclination to the vertical in the x direction of the hangers and tongs suspended from the first, second, fifth and sixth suspension units, engenders an increase in the tangential force components $F_t'$ thereby increasing the tension in the upper margin of the glass sheet. This increase in tension is progressive as the hangers and tongs swing to their new positions during heating and the progressive bending of the glass sheet under the influence of the out-of-plane force components $F_n$ and gravitational forces acting on the sheet.

The counterbalanced suspension system ensures that the vertical force components $F_z$ acting at the gripping points remain unchanged throughout the processing of the sheet so that when the freely suspended bent sheet has adopted its stable curved shape the vertical force components $F_z'$ at the gripping points 11′ and 16′ are still 5.5 N, at the gripping points 12′ and 15′ are still 11 N, and at the gripping points 13′ and 14′ are still 8.5 N.

The tangential force components $F_t'$ at the gripping points 11′ and 16′ have increased to 0.95 N directed towards the sides of the sheet, and the tangential components $F_t'$ at the gripping points 12′ and 15′ have increased to 0.75 N directed towards the sides of the sheet. There are no tangential force components $F_t'$ at the gripping points 13′ and 14′.

The influence of the total force system acting on the sheet to change the shape of the sheet diminishes progressively as the freely suspended hot glass sheet approaches the predetermined curved shape and in the finally bent sheet the components $F_n'$ are now small being 0.2 N acting forwardly at gripping points 11′ and 16′, 0.13 N acting forwardly at gripping points 12′ and 15′, and 0.2 N acting forwardly at gripping points 13′ and 14′.

Until the sheet becomes sufficiently stiffened to be uninfluenced by the forces applied at the gripping points, these remanent forces, although small, act to preserve the bent shape of the glass sheet while it is still hot and is in a condition in which it is very responsive to any change in the applied forces, and are such that the glass sheet adopts the required final shape when it has been cooled sufficiently to prevent any further shape changes.

In particular the out-of-plane force components $F_n'$ at the gripping points 11′ to 16′ counteract any tendency for the curvature of the top edge of the sheet to increase.

The vertical force components $F_z$ acting on the sheet are unchanged throughout the processing of the sheet, because of the balanced suspension system. The force components $F_t'$ and $F_n'$, which change slightly with any further small changes in the shape of the glass sheet, continue to act on the freely suspended bent sheet while it is lowered through the boost heating chamber 23 and into the fluidised bed 27 in the quenching tank 26, which has meanwhile been raised by operation of the scissors-lift table 30 to the position shown in FIG. 1, with the open top of the tank 26 just below the exit 25 from the boost heating chamber 23.

The heaters 24 in the chamber 23 are so regulated that the freely suspended glass sheet is heated through its thickness from the bending temperature of 600° C. to a higher prequenching temperature. A temperature gradient is introduced over the height of the sheet by control of the hoist speed so as to accelerate the sheet as it is lowered through the chamber 23. For example the sheet may be so accelerated as it is lowered through the chamber 23 that the temperature of its lower edge is 665° C. and the temperature of its upper edge is 640° C. as it passes through the exit 25 into the fluidised bed 27.

The glass sheet is quenched in the fluidised particulate material as it enters the horizontal quiescent top surface of the bed 27 and toughening stresses develop rapidly in the glass as it is chilled by the fluidised particulate material which is maintained at a suitable quenching temperature, for example about 60° C. to 80° C. As the glass cools rapidly it becomes stiffened sufficiently to prevent any further change of shape caused by the remanent forces at the gripping points, although some variations in shape and/or orientation of the suspended hot sheet may continue until such time as the glass has its required curved shape when it has cooled to ambient temperature.

The glass sheet remains in the fluidised bed 27 until its temperature is near to the ambient temperature of the bed, by which time any further change in the shape of the sheet due to differential contraction as the sheet cools towards ambient temperature, brings the sheet to the final predetermined curved shape of the vehicle windscreen. The initial relative settings of the suspension points and the gripping points take into account both the continuing change in shape of the hot sheet after the bending dies have opened and before the sheet stiffens, and any slight shape changes during the final cooling and contraction of the sheet while the centre-to-surface temperature gradients produced through the thickness of the sheet by quenching, disappear and the toughening stresses develop in the glass.

When producing an annealed bent glass sheet, the tank 26 is not raised and the hot bent sheet is suspended in ambient air beneath the boost heating chamber as the sheet cools to ambient temperature. The sheet is suspended in the furnace 1 until its temperature is 600° C. and is then bent with the temperature of the bending dies 18 at about 600° C. After passage through the boost heating chamber at uniform speed the temperature of the sheet was 630° C. There was no temperature gradient over the height of the sheet.

The force components Ft' and Fn' continue to act on the hot bent glass sheet which is then freely suspended sufficiently far below the boost heating chamber for the sheet to become gradually cooled through its strain point without any significant centre-to-surface temperature gradients existing through the thickness of the glass.

After the sheet has become sufficiently stiffened to be uninfluenced by the remanent force components there is no further significant change of shape while the stiffened sheet cools to a temperature at which it can be handled.

Although it has been found preferable to use two fixed suspension units when processing large windscreen glasses of the kind illustrated in FIGS. 2 and 8, under some conditions, for example when processing aircraft glasses, or curved motor vehicle side-lights the glass may be suspended without a fixed suspension point, with only one fixed suspension point, or with more than two fixed suspension points when the glass is of complex shape.

Any appropriate liquid chilling medium may be used in place of the fluidised bed for example a light mineral oil, or a mineral oil principally comprising high boiling point fractions, with a small proportion of low boiling point additive, for example toluene.

Figure 4:
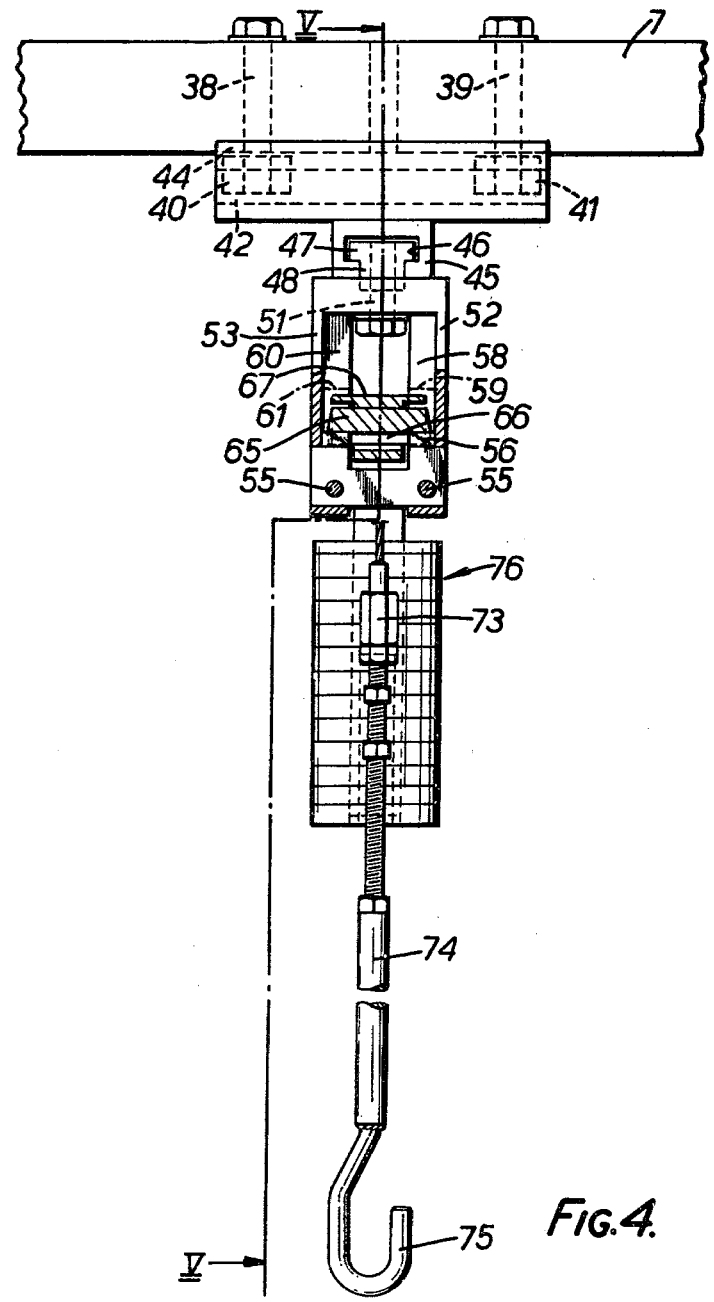
FIG. 4 is a front elevation, partly in section, of one of the series of tong suspension units of FIG. 2.
Figure 5:
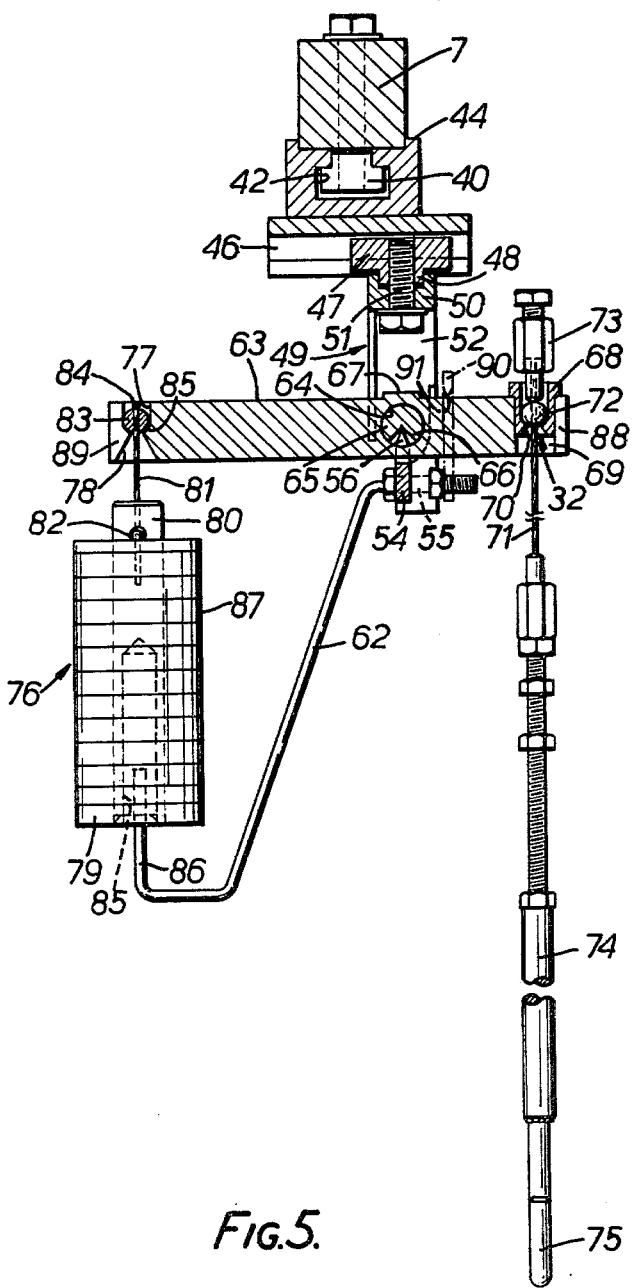
FIG. 5 is a part-section on line V—V of FIG. 4.

FIG. 12 illustrates another embodiment of suspension unit which may be used in place of the unit illustrated in FIGS. 4 and 5.

A pivot support bracket 99 which is secured to the tong bar 7, has a pivot support arm 100 which carries a knife-edge fulcrum 101. A lever 102 is carried by a bridge piece 103 which has an inverted V-shaped bearing 104 which sits on the knife-edge 101. An adjustable counterweight 105 is screwed on to a threaded rod 106 fixed to one end of the lever 102. The other end of the lever 102 has a groove 107 in which there sits a mounting block 108 for a hardened steel pivot pin whose pointed tip constitutes the suspension point 32 for the hanger and tongs. The block 108 has a threaded central hole in which a threaded shaft 109 is screwed.

The lever 102 has an outer end flange 110 which has an aperture for the passage of one end of the shaft 109 which is located by a collar 111. The end of the shaft 109 beyond the flange 110 has a head 112 for engagement by a tool to rotate the shaft and thereby adjust the position of the suspension pivot point 32 relative to the fulcrum 101. The inner end of the shaft is formed as a spigot 113 which is freely rotatable in a bearing hole in the lever.

The suspension unit also includes a hanger, indicated by the general reference 115 for the tongs 10 of conventional design. The hanger 115 includes a stirrup 116 in the form of an elongated open frame of rectangular form. The top piece 117 of the frame carries a bearing block 118 of hardened steel, whose lower face is formed with a conical bearing recess 119 which bears on the pivot point 32. The hanger frame 116 also includes a massive bottom piece 120 having a central hole in which a hanger 121 is hung by nuts. The lower end of the hanger rod has a hook for suspending the tongs in the same way as illustrated in FIGS. 4 and 5.

The suspension of the hanger and tongs by means of the conical bearing recess 119 resting on the point 32 enables the hanger to swing relative to the lever arm 102 through a wide angular range in order to accommodate a required inclination of the line of connection between the suspension pivot point and the gripping point on the glass when the flat glass sheet is suspended from the tongs, and to allow the hanger and tongs to swing readily to a different inclination as the glass changes shape when it is hot and the gripping point 11 moves to the point 11' as shown in FIG. 3.

In the suspension unit the fulcrum 101 is above the line joining the suspension pivot point 32 to the centre of gravity of the counterweight 105. This is a self-correcting unit in that if too great a force is exerted on the glass causing the tong to move upwardly, that movement itself causes the force exerted on the glass to decrease. A glass sheet can be suspended entirely from adjustable suspension units of the kind illustrated in FIG. 12 without the lever of any one of those suspension units being fixed relative to the tong bar.

Figure 13:
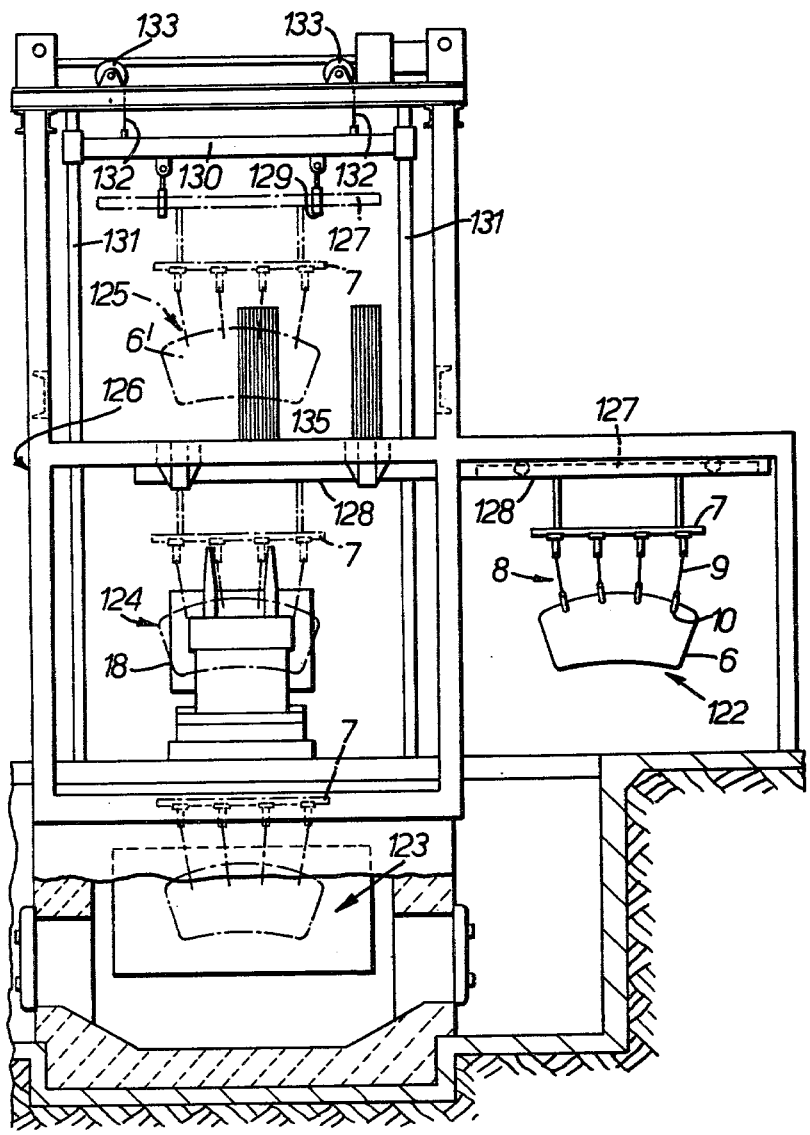
FIG. 13 is a diagrammatic front elevation, partly in section of another glass bending and toughening apparatus to which the invention may be applied.
Figure 14:
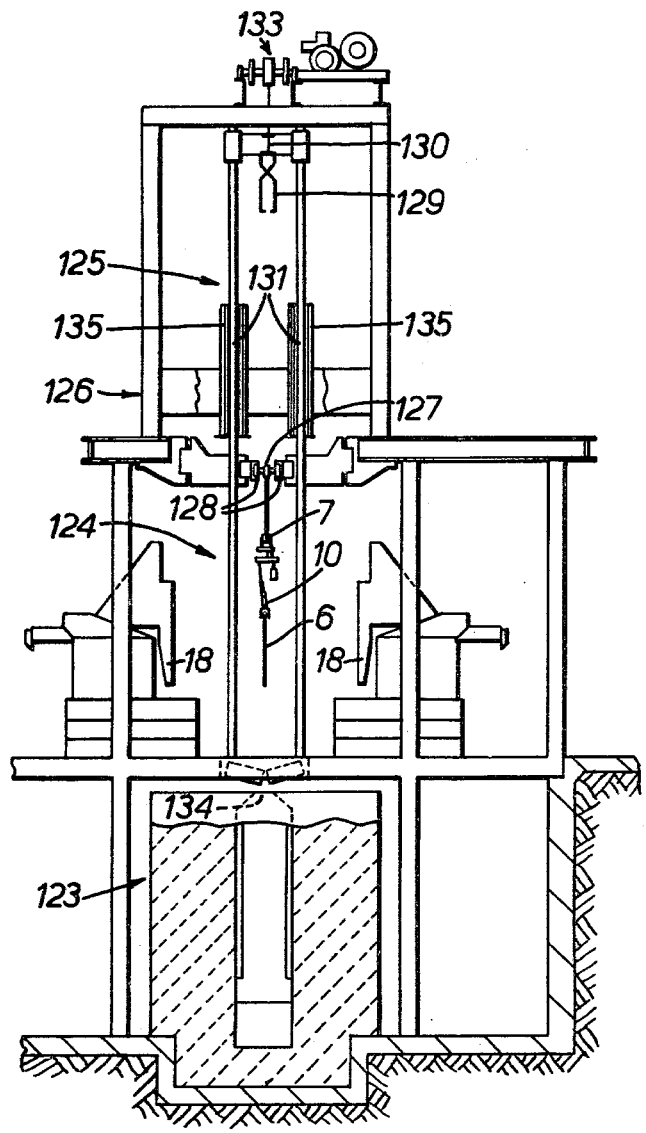
FIG. 14 is an end elevation, partly in section, of the apparatus of FIG. 13.

Another application of the invention is illustrated in FIGS. 13 and 14 which show diagrammatically an intermittent die bending unit for bending the glass sheet and toughening the bent sheet by means of blasts of chilling air. This unit can be used for example for bending and toughening motor vehicle windows, that is windscreen glasses, side-lights, and rear-lights, and can also be used for bending and toughening other products such as aircraft window glasses.

The unit comprises a loading/unloading station 122 at floor level, an electric furnace 123 mounted in a pit beneath the floor level, a bending station 124 located above the furnace 123, and alongside the loading/unloading station, and a toughening station 125 located above the bending station 124.

The bending station 124 and toughening station 125 are housed in a tower structure 126 which extends upwardly above the furnace.

A sheet 6 of soda-lime-silica glass to be bent to a required curved shape of a motor vehicle windscreen is cut to the required shape as illustrated in FIGS. 13 and 14, edge-finished to smooth the cut edges, and then suspended from the tong bar 7 by a series of four suspension units, indicated generally at 8, which are located at predetermined positions on the tong bar so that there are two suspension units 8 symmetrically disposed on either side of the vertical central plane of symmetry of the tong bar and the glass sheet 6, when the sheet is suspended from the tongs 10 which hang, by means of hangers 9 from the suspension units 8.

The tong bar 7 is suspended from a carriage 127 which runs on rails 128 extending from the loading/unloading station 122 into the bending station 124. The rails 128 include swingable rail sections at the bending station 124.

At the beginning of a bending and toughening operation the bending dies 18 of conventional kind mounted at the bending station 124 are retracted as shown in FIG. 14.

When the carriage 127 reaches a central position between the retracted bending dies 18 with the vertical plane of symmetry of the tong bar 7 and the glass sheet 6 coincident with the central vertical plane of symmetry of the bending dies 18, the carriage 127 is engaged by lifting grabs 129 of a hoist mechanism, which grabs 129 are suspended from a hoist beam 130 which runs on vertical rails 131 in the tower 126, and is raised by hoist cables 132 of a hoist mechanism which run around hoist pulleys 133 which are mounted on top of the tower 126. The pulleys 133 are controlled hydraulically in known manner.

The lifting grabs 129 lift the carriage 127 off the rails 128, and the swingable sections of the rails 128 in the bending station 124 swing away to permit the carriage 127 and the suspended glass sheet 6 to be raised and lowered through the bending station.

Doors at the top of the furnace mouth 134 then open and the hoist mechanism lowers the hoist cables 132 and the tong bar 7 is lowered into the mouth 95 of the furnace 123 as shown in FIG. 13.

The glass sheet 6 remains in the furnace 123 for a time sufficient to heat the sheet to a temperature, for example 670° C., well above a predetermined bending temperature, e.g. 650° C., and as the glass sheet softens, the horizontal force components acting on the glass at the gripping points and gravitational forces acting on the sheet, cause the suspended sheet 6 to begin to adopt a smoothly curved, intermediate shape approximating to its required final curved shape.

When the glass has been heated, the furnace mouth is opened and the hot sheet is raised from the furnace 123 to the position illustrated between the bending dies 18 at the bending station 124. The bending dies 18 close on to the already partially shaped sheet to bend the sheet to a curved shape conforming to the predetermined shape of the complementary die surfaces 18.

The dies open when the sheet has been bent to that shape and bending stresses have substantially relaxed. The hoist mechanism again operates to raise the hot bent sheet, now indicated at 6' to the upper position illustrated in FIG. 13 where the bent sheet 6' is suspended between reciprocating blowing frames 135 at the blowing station 125.

Blasts of cooling air from the reciprocating blowing frames 135 play on the surfaces of the sheet to induce toughening stresses in the bent glass sheet in known manner. During toughening the tong bar 7, the tongs 10 and the bent sheet 6' are steadied by steadying wires. A dynamic force system continues to act at the gripping points on the freely suspended bent sheet 6' while it is raised into the toughening station 125 and when chilling by the cooling air commences, and the individual forces acting at the gripping points, together with gravitational forces acting on the sheet are such that the freely suspended bent sheet 6' has adopted a predetermined curved shape by the time the sheet has cooled sufficiently to stiffen the sheet, which shape determines the final shape of the sheet when it has cooled to ambient temperature.

The period from the opening of the dies to the time the glass has become stiffened is short compared with the same time period in the fluidised bed quenching process described with reference to FIGS. 1 to 11. Because the bending dies are relatively cold in the apparatus of FIGS. 13 and 14, the glass sheet is usually heated to a much higher temperature e.g. 670° C. so that the glass is sufficiently hot after bending for the required stress to be induced by quenching between the blowing frames.

The time which the glass spends at the higher temperature, for example 670° C., is greater than the time the glass is at a higher temperature, for example the boost heating temperature of 650° C., in the process described with reference to FIGS. 1 to 11.

It is therefore important when suspending the glass sheet in the apparatus of FIGS. 13 and 14 to determine the magnitudes and directions of the forces applied at the gripping points 11 to 14, primarily so as to contribute to achieving the required glass shape just before the dies close on to the suspended glass sheet, and particularly to avoiding localised distortions such as flattening or bulging of the upper edge of the glass between the tongs which localised distortions are difficult to correct even by the application of the bending dies.

This may mean that, after the dies open, there are small remanent forces which act unfavourably on the glass. This is acceptable, however, since the period involved is short and any small shape changes can be allowed for when designing the shape of the surfaces of the bending dies.

The predetermined curved shape which the hot suspended glass sheet adopts prior to closure of the dies is preferably one which is smoothly and gently curved, but which is sufficiently close to the shape of the surfaces of the bending dies that the glass sheet can be bent quickly to the die shape with a minimum die closure time.

After chilling of the sheet has been completed, the air supplies to the blowing frames 135 are shut off, and the hoist mechanism is again operated to lower the bent and toughened sheet 6' to the position indicated at the bending station 124, where the sheet is suspended between the retracted bending dies 18. The swingable sections of the rails 1 to 8 swing back to their location co-extensive with the rails extending from the loading/unloading station 122 and these rail sections take over support of the carriage 127 from the lifting grabs 129. The carriage 127 is then propelled back to the station 122, where the bent and toughened sheet is unloaded from the tongs 10 and the next flat sheet is loaded for processing.

FIG. 15 is a diagrammatic drawing similar to FIG. 3 showing the spatial relationship between the four suspension points, indicated at 32, 33, 34 and 35 of the suspension units 8 of FIGS. 13 and 14 and the gripping points where the points of the tongs 10 suspended from the four suspension units 8 grip the glass sheet. The positions of the gripping points on the flat glass sheet are indicated at 11, 12, 13 and 14 and the positions to which the gripping points swing when the glass sheet has been heated in the furnace 123 and is suspended between the open bending dies 18 at the bending station 124, that is just prior to the closing of the bending dies on to the glass sheet, are indicated at 11', 12', 13' and 14'. The bending dies complete the bending of the glass sheet to a shape in which the curvature of the sheet is increased somewhat more than indicated in FIG. 15.

The flat glass sheet 6 illustrated in FIGS. 13 to 15 is of soda-lime-silica glass and is 1380 mm wide between the top corners of the sheet and 548 mm high at its centre line 98. The sheet is 3.0 mm thick and weighs 5.24 kg.

The two outer suspension units having suspension points 32 and 35 were fixed by shackles 90 in the manner illustrated in FIG. 5 and their counterweights 76 were such that the levers 63 were held firmly in abutment against the knife-edges 91 of their shackles.

An iterative setting-up procedure was adopted for determining the best locations for the suspension points and gripping points.

The suspension points 32 and 35 were located at an x distance of 500 mm on either side of the plane $P_t$ and at a y distance of 15 mm forward of the plane $P_l$ which is the central longitudinal plane of symmetry of the tong bar 7. The hanger length from the suspension points 32 and 35 to the gripping points 11 and 14 was 516 mm.

The suspension points 33 and 34 were located at an x distance of 171 mm on either side of the plane $P_t$ and at a y distance of 14 mm behind the plane $P_l$. The hanger length from the suspension points 33 and 34 to the gripping points 12 and 13 was 488 mm.

The gripping points 11 and 14 were at an x distance of 490 mm on either side of the plane $P_t$ and the gripping points 12 and 13 were located at an x distance of 155 mm on either side of the plane $P_t$.

As indicated in FIG. 15 the flat glass sheet 6 hangs vertically in the longitudinal central plane of symmetry $P_l$ of the tong bar 7.

The hangers and tongs of the outer suspension units, having suspension points 32 and 35, were inclined inwardly in the x direction towards the centre of the glass sheet at an angle of 1.1° to the vertical and were inclined rearwardly in the y direction at an angle of 1.7° to the vertical.

The hangers and tongs of the inner suspension units having suspension points 32 and 34 were inclined inwardly in the x direction towards the plane $P_t$ at an angle of 1.6° to the vertical and were inclined forwardly in the y direction at an angle of 1.6° to the vertical.

The inclination of the hangers and tongs is exaggerated in the drawings.

The counterweights of the inner suspension units were loaded so that the vertical component of force Fz acting at each of the gripping points 12 and 13 was 12.52 N. The vertical component of force Fz acting at each of the gripping points of the fixed outer suspension units was 13.7 N.

The force component Ft acting at each of the gripping points 11 and 14 was 0.27 N acting outwardly towards the sides of the glass sheet. The force component Ft acting at each of the gripping points 12 and 13 was 0.41 N acting outwardly towards the sides of the glass sheet. The overall effect of these outward force components Ft contributed to maintaining the upper margin of the suspended glass sheet under tension while it was being heated and was bending in the furnace 123.

The out-of-plane force components Fn normal to the plane of the suspended flat glass sheet 6 were 0.4 N forwardly at gripping points 11 and 14, and 0.36 N rearwardly at gripping points 12 and 13.

While the freely suspended glass sheet 6 was being heated to 670° C. in the furnace 123, the out-of-plane force components Fn and gravitational forces act on the softening glass sheet and movement of the side regions of the sheet forwardly begins, simultaneously with rearward movement of the central region of the sheet towards the shape indicated at 6' in FIG. 15. This movement continues until the sheet adapted to a predetermined curved shape 6' before it is presented to the bending dies.

The gripping points 11' and 14' were then located at an x distance of 485 mm on either side of the plane $P_t$, and at a y distance of 14 mm in front of the plane $P_l$.

The gripping points 12' and 13' were then located at an x distance of 153 mm on either side of the plane $P_t$ and at a y distance of 13 mm behind the plane $P_l$.

The hangers and tongs depending from the outer suspension points 32 and 35 were then inclined inwardly in the x direction at an increased angle of 1.7° to the vertical and were inclined rearwardly in the y direction at an angle of 0.1° to the vertical, having swung towards the vertical during bending of the glass sheet by an angle of 1.6°.

The hangers and tongs depending from the inner suspension points 33 and 34 were inclined inwardly in the x direction towards the plane $P_t$ at an increased angle of 2° to the vertical and were inclined forwardly in the y direction at an angle of 0.1° to the vertical having swung towards the vertical during bending of the glass sheet through an angle of 1.5°.

The distribution of the weight of the sheet between the suspension units remains the same as when the flat glass sheet 6 was suspended so that the vertical components of force Fz acting at the gripping points were unchanged.

The tangential force components Ft' acting at the gripping points 11' and 14' was 0.4 N directed towards the sides of the glass sheet and the force components Ft' at the gripping points 12' and 13' was 0.46 N also directed towards the sides of the glass sheet so that the upper margin of the glass sheet remained under tension.

As the softened glass sheet bends under the influence of the total force system acting on the glass sheet, influence of the total force system acting on the sheet in changing the shape of the sheet diminishes progressively as the freely suspended hot glass sheet approaches a predetermined curved shape. When the suspended sheet 6' had adopted the curved shape indicated in FIG. 15, the components Fn' at the gripping points 11' and 14' had reduced to 0.05 N acting rearwardly and at the gripping points 12' and 13' had reduced to 0.06 N acting rearwardly. These are the forces acting on the curved glass sheet as the bending dies 18 close on to the sheet and bend the sheet to the required final shape with greater curvature at the outer sides of the bent glass sheet.

Because the bending dies 18 are not heated, the final curved shape of the cooled glass sheet after quenching is different from the bent shape of the sheet raised from the bending dies to the toughening station 125.

The method and apparatus of the invention can also be employed in a continuous multi-stage die bending and toughening plant in which a number of glasses are present in the plant at the same time, each at a different station as they move from a loading station to an adjacent unloading station.

Both in such a continuous plant and in the intermittent plant of FIGS. 13 and 14 there are horizontal movements of the suspended glass, and it has been found that the suspension system of the invention is advantageous during such movements because horizontal oscillation of the glass sheet is accommodated in the suspension units and any tendency to "walking" of the tong points on the glass is eliminated.

The invention can be employed for the processing of glass sheets of any thickness and size, for example windscreen glasses, side-lights and rear-lights of all kinds for the whole range of motor vehicles. Such glass may be from 1.5 mm to 6 mm thick depending on its location in the vehicle or whether it is to be a component of a laminate.

The invention can also be used for producing curved glass sheets for other purposes such as windows and other architectural uses in buildings, and windows in other vehicles such as trains, ships and aircraft.

A windscreen glass 6 mm thick may weigh about 12 kg, a 4 mm glass may weigh about 9 kg and a 3 mm thick glass may weigh about 6.75 kg. For each thickness of a comparable glass shape it was found that the settings of the gripping points on the glass relative to the suspension points were substantially the same. The balance of the system was adjusted either by using heavier or lighter counterweights in order to maintain the desired distribution of the weight of the glass as between the suspension units, so that the vertical force components $F_z$ at each gripping point was preset, and the suspension system was always balanced before processing started.

The toughened or annealed sheets may be used as components of laminated windscreens for a motor vehicle. For example the outer sheet of the laminated windscreen may be an annealed sheet with a thermally toughened sheet as the inner sheet. There is excellent conformity of both the toughened sheet and the annealed sheet to the required shape, because the manner of suspension of the hot bent sheet ensures that there are no mismatches of sheets such as can cause problems during laminating. It is thus possible to produce a run of toughened sheets, followed by a run of annealed sheets and to take two unrelated sheets from stock for laminating together. Also two annealed curved sheets produced by the method of the invention can be taken from stock and laminated together. In the past, it was normal to produce two annealed sheets for laminating together by bending as a pair in a sag-bending process.

The two ways of operating the invention described with reference to FIGS. 1 to 11 and FIGS. 13 to 15, are examples of many methods which can employ the suspension technique of the invention for suspending glass sheets to be heated and bent and then annealed or toughened by quenching. In one such process quenching may be effected while the suspended sheet is held between bending dies.

When the bent sheet is being quenched in a chilling medium, for example in the fluidised bed illustrated in FIG. 1, an initial quenching step may be effected by subjecting the hot bent glass sheet, which has been reheated to a boost heating temperature, to blasts of chilling air, directed at both surfaces of the glass sheet as it passes between the bottom of the boost heating chamber 23 and the top of the tank 27 in which the sheet is quenched in the fluidised bed. This prequenching step sets up the surfaces of the hot glass sheet prior to the glass being immersed in the fluidised particulate material and also effects an initial chilling of the glass surfaces such that when the glass sheet enters the fluidised bed, temperature gradients already exist from the centre of the thickness of the sheet to the surfaces of the sheet.

When the required curved shape of the glass sheet is simple and does not involve sharp bends, the required predetermined curved shape can be achieved without the use of bending dies. The change of shape of the glass sheet is brought about by the effect of the total force system acting on the sheet, including the individual forces acting at the gripping points and forces due to gravity.

In another process according to the invention, the suspended glass sheet achieves a predetermined curved shape, and bending dies may be used which cause no appreciable further change of shape but are applied to the glass simply to ensure that each curved sheet conforms to a die shape at that point in the process.

What I claim is:

1. A method of producing a curved glass sheet, comprising suspending a hot glass sheet at forming temperature at a series of gripping locations spaced along the upper margin of the sheet, subjecting the hot glass sheet to individual forces at those gripping locations, at least some of which individual forces have components out of the plane of the sheet and which individual forces each have a magnitude and direction dependant on the weight and shape of the glass, to ensure that the freely suspended hot glass sheet adapts towards a predetermined curved shape as the magnitudes and directions of the forces vary during the change of shape of the glass, and permitting the magnitudes and directions of the forces to vary so that the influence of the total force system acting on the sheet in changing the shape of sheet diminishes as the sheet approaches the predetermined curved shape.

2. A method of producing a curved glass sheet, comprising suspending a glass sheet at a series of gripping locations spaced along the upper margin of the sheet, applying individual forces to the glass sheet at those gripping locations, at least some of which individual forces have components out of the plane of the sheet and which individual forces each have a magnitude and direction dependant on the weight and shape of the glass so that the total force system acting on the sheet forms the freely suspended glass sheet when hot to a required curved shape, heating the suspended glass sheet to forming temperature so that the suspended sheet softens and is impelled by said total force system towards the required curved shape, permitting the magnitudes and directions of the forces to vary individually as the influence on the glass of the total force system acting on the sheet diminishes during the approach of the sheet towards the required curved shape, and cooling the sheet in a manner such that it had adopted the required curved shape when it is sufficiently stiffened to be uninfluenced by the remanent forces applied at the gripping locations.

3. A method of producing a curved glass sheet, comprising suspending the sheet at bending temperature at a series of gripping locations spaced along the upper margin of the sheet, applying individual forces to the hot glass sheet at those gripping locations, at least some of which individual forces have components out of the plane of the sheet and which individual forces each have a magnitude and direction dependant on the weight and shape of the glass so that the freely suspended hot glass sheet adopts a curved configuration approaching the required curved shape under the influence of the total force system acting on the sheet which varies as the gripping locations move relative to each other, bending the curved sheet, whose shape is changing under the influence of said total force system, to a bent shape which determines a required final curved shape of the sheet, which bent shape is such that there are remanent forces at the gripping locations which act on the freely suspended bent sheet as it is cooled until it is sufficiently stiffened to be uninfluenced by those forces and has adopted the required final curved shape.

4. A method according to claim 3, wherein the individual forces applied to the glass at the gripping locations are such that the remanent forces acting on the freely suspended bent sheet oppose any tendency of the sheet to deform from said bent shape under the influence of gravitational forces.

5. A method of producing a curved glass sheet, comprising suspending a flat glass sheet at a series of gripping locations spaced along the upper margin of the sheet, applying individual forces to the flat glass sheet at those gripping locations, at least some of which individual forces have components out of the plane of the sheet and which individual forces each have a magnitude and direction dependant on the weight and shape of the sheet so that the flat glass sheet is strained towards a required shape by the total force system acting on the sheet, heating the suspended glass sheet to forming temperature during which heating the suspended glass sheet is impelled towards a partially curved shape as stresses in the sheet relax, bending the partially curved sheet whose shape is changing under the influence of said total force system, to a bent shape which determines a required final curved shape of the sheet, which bent shape is such that there are remanent forces at the gripping locations which act on the freely suspended bent sheet as it is cooled until it is sufficiently stiffened to be uninfluenced by those forces and has adopted the required final curved shape.

6. A method according to claim 1, wherein the gripping locations are gripping points spaced along the upper margin of the sheet, and some at least of the gripping points are individually counterbalanced in a manner to maintain a predetermined distribution of the weight of the sheet amongst the gripping points during the curving of the sheet.

7. A method according to claim 6, wherein the sheet is suspended from a series of suspension points which are respectively connected to the series of gripping points, at least one of the suspension points is fixed, and the rest of the suspension points are vertically movable to accommodate movement of the gripping points during curving of the sheet and are individually counterweighted to maintain said distribution of the weight of the sheet.

8. A method according to claim 7, wherein the suspension points are located so that, when viewed from above, they lie on a curve approximating to the curve of the upper margin of the required curved sheet.

9. A method according to claim 7, wherein two of the suspension points are fixed and are located one on each side of the centre of the sheet, the rest of the suspension points are vertically movable, and the gripping points are so located on the sheet relative to the suspension points as to determine the out-of-plane force components which are applied to the sheet at the gripping points.

10. A method according to claim 7, wherein the suspension points are located on a curve which, when viewed from above, approximates to the curve of the upper margin of the required curved sheet, two of the suspension points are fixed and are located one on each side of the centre of the sheet, the rest of the suspension points are vertically movable, and the gripping points are so located on the sheet relative to the suspension points as to determine the out-of-plane components which are applied to the sheet at the gripping points.

11. A method according to claim 1, wherein the curved glass sheet is thermally toughened by contacting the freely suspended curved sheet with a chilling medium, said total force system continues to act on the sheet until the chilling medium stiffens the sheet sufficiently to be uninfluenced by those forces, and thereafter the sheet adopts its required final shape as cooling continues in the chilling medium.

12. A method according to claim 11, wherein, immediately before the curved sheet is contacted with the chilling medium, the sheet is heated through its thickness to a temperature higher than the temperature at which it was curved, and the individual forces applied to the sheet ensure that the sheet adopts a required final curved shape by the time the sheet has cooled to ambient temperature.

13. A method according to claim 3, wherein the bent sheet is thermally toughened by contacting the freely suspended bent sheet with a chilling medium, the total force system continues to act on the sheet until the chilling medium stiffens the sheet sufficiently to an extent that it is uninfluenced by those forces, and thereafter the sheet adopts its required final shape as cooling continues in the chilling medium.

14. A method according to claim 12, wherein immediately before the bent glass sheet is contacted with the chilling medium the sheet is heated through its thickness to a temperature higher than the temperature at which it was bent, and the individual forces applied to the sheet ensure that the sheet adopts a required final curved shape by the time the sheet has cooled to ambient temperature.

15. A method of producing a curved glass sheet, comprising the steps of:
(a) suspending a flat glass sheet at a series of gripping locations spaced along the upper margin of the sheet;
(b) subjecting the glass sheet to individual forces at those gripping locations, at least some of which individual forces have components acting out of the plane of the sheet and which individual forces each have a magnitude and direction dependant on the weight and shape of the glass to ensure that the freely suspended glass sheet is subjected to a total force system initially seeking to change its shape towards a first predetermined curved shape;
(c) heating the glass sheet above its strain point to permit change of shape under the influence of said total force system which includes gravitational forces acting on the sheet; and
(d) permitting the magnitudes and directions of said individual forces to vary so that the efficacy of the total force system acting on the sheet to change the shape of the sheet diminishes as the sheet approaches said first predetermined curved shape.

16. A method of producing a curved glass sheet, comprising the steps of:
(a) suspending a flat glass sheet at a series of gripping locations spaced along the upper margin of the sheet;
(b) subjecting the glass sheet to individual forces at those gripping locations, at least some of which individual forces have components acting out of the plane of the sheet and which individual forces each have a magnitude and direction dependent on inverted V-shaped bearing which locates the lever on the fulcrum.

25. Apparatus according to claim 23, wherein each suspension point comprises a cup-shaped bearing fitted in the lever, and each hanger comprises a flexible suspension which has at its upper end a ball which seats into the cup-shaped bearing and which is attached at its lower end to a suspension hook for a pair of tongs.

26. Apparatus according to claim 23, wherein the fulcrum is pivotable relative to the tong bar to swing the lever about a vertical axis.

27. Apparatus according to claim 20, characterised in that at least one suspension unit includes means for restricting pivotal movement of said one arm of the lever which carries the suspension point.

28. Apparatus according to claim 27, wherein the means for restricting pivotal movement comprises a shackle positioned over said one arm of the lever and fixed relative to the tong bar to act as a stop restricting pivotal movement of that arm.

* * * * *